(12) United States Patent
Chaubard

(10) Patent No.: US 11,080,559 B2
(45) Date of Patent: Aug. 3, 2021

(54) PRODUCT ONBOARDING MACHINE

(71) Applicant: Focal Systems, Inc., Burlingame, CA (US)

(72) Inventor: Francois Chaubard, Burlingame, CA (US)

(73) Assignee: Focal Systems, Inc., Burlingame, CA (US)

( * ) Notice: Subject to any disclaimer, the term of this patent is extended or adjusted under 35 U.S.C. 154(b) by 152 days.

(21) Appl. No.: 16/575,298

(22) Filed: Sep. 18, 2019

(65) Prior Publication Data

US 2020/0089997 A1 Mar. 19, 2020

Related U.S. Application Data

(60) Provisional application No. 62/733,079, filed on Sep. 18, 2018.

(51) Int. Cl.
*G06K 9/62* (2006.01)
*G06K 9/00* (2006.01)
*G06K 9/20* (2006.01)
*G06K 9/44* (2006.01)

(52) U.S. Cl.
CPC ....... *G06K 9/6256* (2013.01); *G06K 9/00214* (2013.01); *G06K 9/209* (2013.01); *G06K 9/2027* (2013.01); *G06K 9/44* (2013.01); *G06K 9/6262* (2013.01); *G06K 2209/27* (2013.01)

(58) Field of Classification Search
CPC ............... G06K 9/6256; G06K 9/6262; G06K 9/00214; G06K 9/209; G06K 9/2027; G06K 9/44; G06K 2209/27; G06K 9/3233

USPC .......................................................... 382/103
See application file for complete search history.

(56) References Cited

U.S. PATENT DOCUMENTS

| | | | |
|---|---|---|---|
| 2013/0273968 A1* | 10/2013 | Rhoads | H04W 4/50 455/556.1 |
| 2015/0310601 A1 | 10/2015 | Rodriguez et al. | |
| 2016/0180195 A1 | 6/2016 | Martinson et al. | |
| 2017/0286773 A1 | 10/2017 | Skaff et al. | |

(Continued)

OTHER PUBLICATIONS

PCT International Search Report and Written Opinion, PCT Application No. PCT/US2019/051795, dated Nov. 22, 2019, 14 pages.

*Primary Examiner* — Ali Bayat
(74) *Attorney, Agent, or Firm* — Fenwick & West LLP

(57) ABSTRACT

A method for generating training examples for a product recognition model is disclosed. The method includes capturing images of a product using an array of cameras. A product identifier for the product is associated with each of the images. A bounding box for the product is identified in each of the images. The bounding boxes are smoothed temporally. A segmentation mask for the product is identified in each bounding box. The segmentation masks are optimized to generate an optimized set of segmentation masks. A machine learning model is trained using the optimized set of segmentation masks to recognize an outline of the product. The machine learning model is run to generate a set of further-optimized segmentation masks. The bounding box and further-optimized segmentation masks from each image are stored in a master training set with its product identifier as a training example to be used to train a product recognition model.

20 Claims, 5 Drawing Sheets

(56) References Cited

U.S. PATENT DOCUMENTS

| | | | |
|---|---|---|---|
| 2018/0025412 A1* | 1/2018 | Chaubard | G06K 9/00771 |
| | | | 705/26.9 |
| 2018/0157939 A1 | 6/2018 | Butt et al. | |
| 2018/0204111 A1* | 7/2018 | Zadeh | G06K 9/3233 |
| 2019/0122384 A1 | 4/2019 | Ertle et al. | |
| 2019/0130167 A1* | 5/2019 | Ng | G06K 9/00268 |
| 2019/0130214 A1 | 5/2019 | N et al. | |
| 2019/0294889 A1* | 9/2019 | Sriram | G06K 9/6274 |
| 2020/0184278 A1* | 6/2020 | Zadeh | G06F 16/953 |
| 2020/0210768 A1* | 7/2020 | Turkelson | G06K 9/6267 |

\* cited by examiner

PRODUCT ONBOARDING MACHINE

CROSS REFERENCE TO RELATED APPLICATIONS

This application claims the benefit of U.S. Provisional Application No. 62/733,079, filed Sep. 18, 2018, which is incorporated by reference in its entirety.

BACKGROUND

This disclosure relates generally to obtaining training data and specifically to generating training examples for a product recognition model.

Humans can recognize a multitude of products in images with little effort, even though the image of the products may vary somewhat from different viewpoints, in many different sizes and scales or even when they are translated or rotated. Products can even be recognized when they are partially obstructed from view. This task, however, is still a challenge for computer vision systems. Computer vision systems can perform object recognition using machine learning models (e.g., deep learning models, convolutional neural networks, etc.). These models, however, can learn to identify objects by analyzing thousands of training images and learning the features that makes-up each object. Obtaining thousands of relative training images is challenging and does no scale well. For example, an automated checkout system for a grocery store (or other retail store) would need to train a product recognition model of the automated checkout system using thousands of images of each product that the store carries. To obtain these images, conventional approaches include collecting these images by scraping the web, manually collecting one at a time, or some other equally as tedious method. Then, a human operator would label or annotate each image with perhaps a bounding box, bounding polygon, and/or product identifier per instance. Not only is this tedious, it is time consuming, error-prone, and expensive.

SUMMARY

A method for generating training images and labels (bounding box, segmentation masks, and product identifiers) for a product recognition model is disclosed. The method includes capturing image data of a product using an array of cameras located in different positions relative to the product. In one embodiment, the cameras capture video data and the product is hung from a wire and moved (e.g., swung, spun, etc.) such that the cameras capture many images of the product from many different angles, perspective, and so forth. A product identifier for the product is associated with each of the images (e.g., in metadata, via a folder name where the images are stored, etc.). A bounding box for the product is identified in each of the images by tracking the product through the image frames of the video from each camera using, for example, a general object detection model or a depth sensor and tracking algorithm such as a Kalman Filter.

A segmentation mask for the product is then identified in each bounding box using, for example, a segmentation algorithm or depth sensor. The segmentation masks and/or bounding boxes for the product(s) are optimized to generate an optimized set of segmentation masks for the product. The segmentation masks are optimized using, for example, a probabilistic graphical model, such as a temporal conditional random field algorithm. As an additional cleaning step, the optimized segmentation masks can be further-optimized by training a small machine learning model on the optimized set of segmentation masks, bounding boxes, and product identifiers to detect and recognize the outline of each instance of that product. Since the model is small, it cannot fit the noise in the optimized segmentation masks thus fitting a tighter segmentation mask than before to, thereby, produce a further-optimized segmentation mask. The original optimized set of segmentation masks for the product are then discarded and the segmentation masks from each image is stored with its further-optimized segmentation mask and product identifier as a training example to be added to a master training set for a final product recognition model, such as an automated checkout system of a retail store.

Since this master training set includes example images of each product that span many camera extrinsic variations (rotation, distance away, lighting, etc.) and intrinsic variations (lens distortions, exposure, auto-focus, auto-white balance settings, etc.) that could happen in the real-world, the training data and accurate labels can produce a final product recognition model that is highly accurate. The master training set's further-optimized segmentations masks can also be injected into synthetic scenes with various backgrounds to create infinite amounts of synthetic training data to be used to train a machine learning model to achieve even higher accuracies on real world data. The cost to achieve this fete was only the cost of a human operator for one to ten minutes per product, which may be as low as $2. The cost of collecting and labeling this much data and achieving this high accuracy without this machine could cost as high as $2,000-$20,000 per product.

Figure 1:
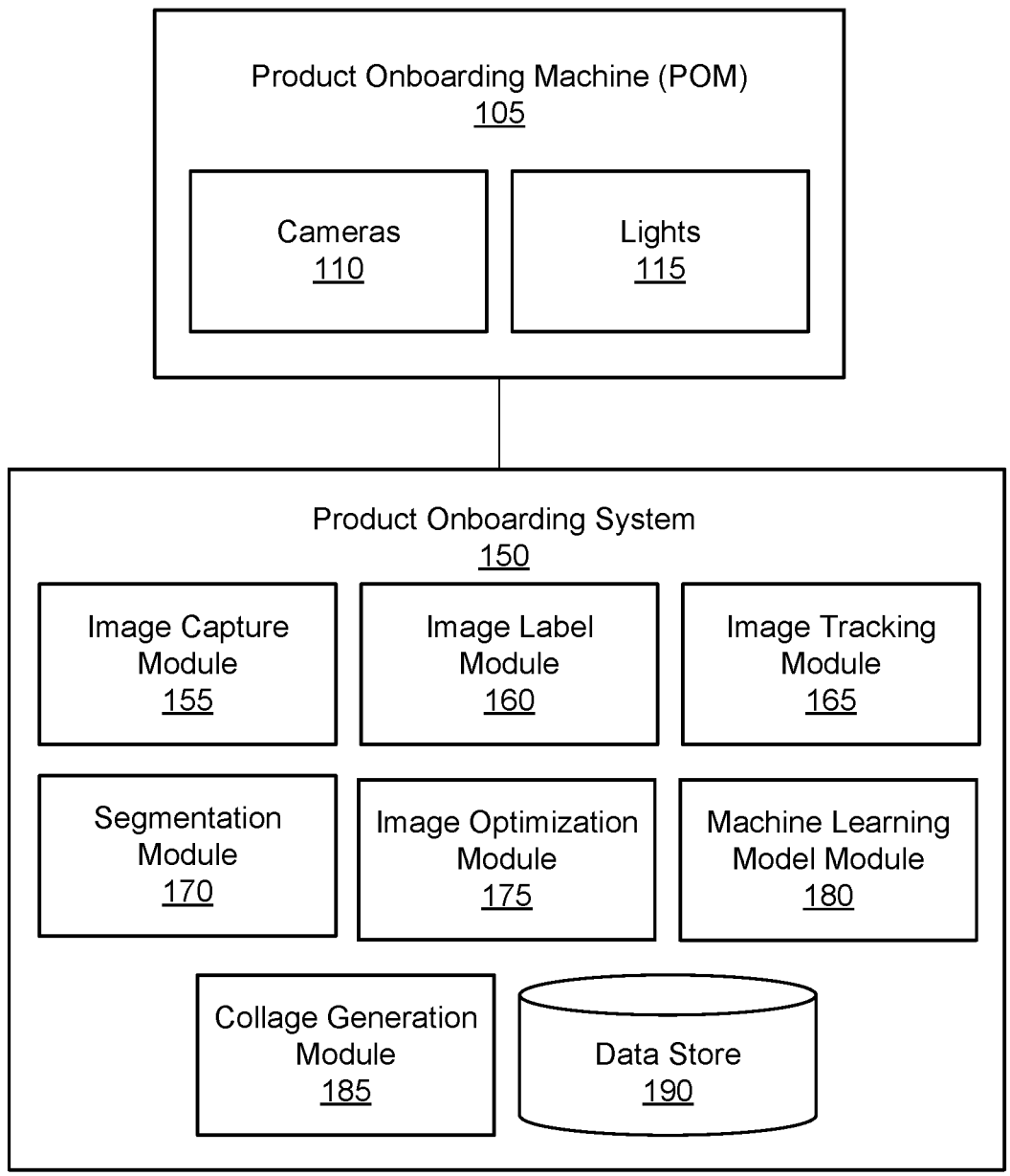
FIG. 1 is a block diagram of a system environment in which product onboarding is performed, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

The method includes initially scanning a product's barcode (or manually typing it in if a barcode does not exist) to obtain a product label, Universal Product Code (UPC), Stock Keeping Unit (SKU) or Product Look Up code (PLU) to act as a product identifier for that type of product. The product is placed within a product onboarding machine (POM) that captures a plurality of images (or video), volume, and/or depth information of the product from multiple different angles and while changing various parameters of the images to span a set of the various conditions under an image of the product could be captured. These various conditions include variations in lighting, orientation, perspective, background, distance, occlusions, resolution, autofocus settings, and so forth. In one embodiment, the product is placed within the POM by hanging the product by a string such that the product hangs within a focus area of a camera array. The product is then spun and/swung in order for the camera array to capture the plurality of images of the product from a number of different angles and so forth. In another, the product is placed on a table and a human manually moves the product around spanning all rotations, flips, and positions of the product while the cameras and sensors record the product information.

A product detection bounding box model (e.g., Region-based Convolutional Neural Network (RCNN), Faster RCNN, etc.) is used to identify a bounding box for the product in each of the plurality of images and the product label for the product is associated (or added) to each bounding box for each image. A tracking algorithm that merges the predicted bounding box and the previous images bounding boxes is used to infer a smoothed bounding box track over the video. This can be implemented using a simple Intersection over Union to merge tracks from frame to frame, or by using Non-Maximum Suppression, or by using a Kalman Tracker, etc. This allows the system to clean up predictions from frame to frame that may be large jumps in pixel space that are just not likely. For example, some images for certain orientations of the product may occlude a sufficient amount of identifying image information that would make detecting and identifying the full product extremely difficult or impossible in isolation. However, since the tracking algorithm tracks a bounding box for the product and associates the product label with the bounding box from image to image (or frame to frame of video), the product label for the product is associated with those difficult to identify orientations of the product. Accordingly, these images with labeled bounding boxes are added to a master training set which can be used later to train a model for recognizing products. This process is repeated for each of a number of products.

In one embodiment, the system uses a procedure to optimize the POM and use of the system to ensure the data that is collected produces a trained model that can generalize to real-world environments. In order to ensure the images that are collected will produce the most accurate and generalizable final model, a number of test products are selected and images of the test products are captured to generate a test set of images not using POM. Instead, these test images of the test products are captured using different cameras under different conditions in the real-world in order to evaluate how generalized the models that have been trained on POM generated data is under different real-world conditions. For example, if the POM-data trained model performs poorly on the test set, then some parts of the POM would need to be changed in some way to generalize better on the real-world data (adding new lighting variations, increase the time per product in POM to collect more data, try different exposure settings in the camera, etc.). Accordingly, the results of the model are reviewed and, for the images that the model got wrong from the test set of images, the POM can be modified or additional images for particular orientations and/or lighting conditions, etc. can be captured in order to make up for any deficiencies or other weaknesses. This may include throwing away certain sets of training data and repeating the image capture process until the model is accurate to within an acceptable margin of error. Certainly, if the final trained model does well on the test set, then the POM and process to use POM is appropriate and should not change.

In one embodiment, the final master training set, which consists of N products, Ni images per product, Ni bounding boxes per product, and Ni segmentation masks per product, can be used to train a Deep Learning Computer Vision model like Mask-RCNN on all N products. It can also be used to train an embedding model to map each segmented set of pixels or cropped bounding box to a vector where it is trained to have vectors of the same class close to each other and those of different classes far away from each other in the vector space. Further to this effect, it can be trained to have vectors of the same class and orientation close to each other and those of different classes or different orientations far away from each other in the vector space.

In one embodiment, the master training set can be used to create a synthetic scene where many images can be sampled from where the segmentations or bounding boxes are placed in this fictitious scene, the scene generator takes an image from a specific or random vantage point, and saved with the labels saved correspondingly to be later used as training data. This method permits any scene to exist in the training data, with any background with any number of products in any orientation or layering. The synthetic scene, in an embodiment, includes images of different products scattered randomly where the images of the different products are of random variations in perspective, lighting, occlusion, resolution, etc.

System Architecture

FIG. 1 is a block diagram of a system environment 100 for a product onboarding system 150. The system environment 100 shown by FIG. 1 comprises a product onboarding machine (POM) 105 and the product onboarding system 150. In alternative configurations, different and/or additional components may be included in the system environment 100. The POM 105 captures images of products and the product onboarding system 150 optimizes the images for uses as training examples for a product recognition model.

The POM 105 includes multiple cameras 110 and lights 115 to capture a plurality of images of each product. The cameras 110 are each positioned on the POM 105 to capture the image data of the product from a different perspective (or angle). In one embodiment, the cameras 110 are the same make and model camera. In another embodiment, the cameras 110 include a number of different make and/or model cameras to collect image data from a variety of different camera types. These include high quality cameras, low quality cameras, DSLR cameras, smartphone cameras, and so forth. The image data can additionally include video data, volume data, and/or depth data of the product. In one embodiment, the cameras 110 are each configured to capture 10-20 frames per second video. Thus, ten cameras 110 mounted to POM 105 capturing, for example, 14 frames per second video from ten different perspectives is 140 images of the product every second. In another, the cameras 110 can move while the product is moving, thereby spanning the different viewpoints, camera types, and product orientations as much as possible.

The lights 115 are arranged around a staging area of the POM 105 to illuminate the product. The lights 115 can be of different color lights (red, green, blue) and can be configured to vary the lighting of the product. For example, the lights 115 may flash (or strobe), cycle through different colors, increase and then decrease in brightness, and so forth.

Accordingly, a product is placed within POM 105 and the cameras 110 capture image data of the product from each of the different position while the lights 115 vary the lighting conditions to span a set of the various conditions under which an image of the product could be captured. These various conditions include variations in lighting, orientation, perspective, background, distance, occlusions, resolution, and so forth.

Once the image data is captured by the POM 105, the product onboarding system 150 optimizes the image data to generate training images and labels (e.g., 1000-10,000 training images and labels per product) of the product to be added to the master training set to be later used to train a product recognition model. The product onboarding system 150 includes an image capture module 155, an image label module 160, an image tracking module 165, a segmentation module 170, an image optimization module 175, a machine learning model module 180, collage generation module 185, and a data store 190.

The image capture module 155 provides instructions to the cameras 110 to capture the image data of the product. Additionally, the image capture module 155 facilitates the retrieval of the image data from the POM 105. For example, image capture module 155 may facilitate creation of a new folder for the image data of the product for each product.

The image label module 160 associates a product identifier (e.g., a universal product code (UPC), stock keeping unit (SKU), etc.) for the product with each of the plurality of image frames. In one embodiment, the product identifier is tagged to a folder comprising the image data for the product. In other embodiments, the product identifier is described in the metadata of each image frame, is paired to the image or bounding box in a comma separated file or a database, and so forth.

The image tracking module 165 identifies a bounding box for the product in each of the plurality of image frames by tracking the product through the plurality of image frames. In one embodiment, the product is hung in a staging area of the POM 105 and swung and/or spun from a wire in order for the cameras 110 to capture many different angles and positions of the product. Thus, the image tracking module 165 tracks the product from one frame to the next by identifying a bounding box for the product in each image frame. Tracking is advantageous because there are many angles of a product that, in isolation, bear no resemblance to the product from other angles. For example, one image of a side view of a pen bears no resemblance to another image looking squarely-down the circular barrel of the pen. However, with image tracking, there is very little variation of the product from frame to frame (e.g., using 10-20 frames per second, the product moves very little in this time frame), thereby, allowing the image tracking module 165 to track the product in each image frame since the context does not change that much at such a high sampling rate. An additional benefit that occurs at final training time, capturing these very small changes allows the product onboarding system 150 to identify the product at very difficult angles of the product that, in isolation, could potentially be unrecognizable, such as the top circular portion of a pen.

Typically, deep learning computer vision models are very sensitive to very small changes in the image, such as a change in lighting, or perspective, can result in large changes in predicted output. In one embodiment, the timestamp of the video is stores as well to permit a training procedure that penalizes the model if the predicted output is meaningfully different when the timestamps between the images are very close. This is referred to as an inconsistency penalty. For example, two frames that are taken within e.g. 0.1 seconds of each other should look very similar since the world does not change much in this environment in that short of a time, but if one frame is predicted to be a bottle of Tide with probability 99% and the next frame is predicted to be Coca-Cola with probability 99%, then without knowing anything about the labels, the model will receive a penalty. This helps the model learn much quicker and get to higher accuracies with the same or similar number of training examples.

In one embodiment, each image frame stored in the folder for the product identifier of the product is cropped based on the bounding box. Thus, instead of the actual image frames being stored in the folder for the product, only the bounding box portion of the image frames are stored in the folder. Accordingly, the image tracking module 165 returns a set of bounding boxes enclosing the product from each the image frames.

The segmentation module 170 identifies a segmentation mask for the product in each bounding box. The segmentation mask is an outline of or polygon surrounding the product within each bounding box that can be later identified using semantic segmentation or instance segmentation using algorithms like Mask-RCNN. Thus, the segmentation module 170 identifies where the relevant portion of the product begins and ends inside each bounding box. For example, the segmentation mask can be a matrix of 0s and 1s where the 1s identify the product within the bounding box and 0s are background. Put another way, the segmentation mask is a 0 or a 1 assigned to each pixel of the bounding box. In another embodiment, the segmentation mask could use "soft labels" meaning that the values in the matrix are between 0 and 1, the higher the number the higher the confidence that pixel is a pixel of the product. Accordingly, the segmentation module 170 returns an area within each bounding box that corresponds to the product. In one embodiment, the initial bounding boxes and segmentation mask is generated using a general-purpose (or product-agnostic) Mask-RCNN that produces bounding boxes and course segmentation masks. In another embodiment, the initial bounding box and segmentation mask is used to leverage the depth sensor information. In some embodiments, these initial segmentations likely need to be cleaned-up by leveraging the temporal and spatial nature of the collected data.

The image optimization module 175 optimizes the segmentation masks for the product using a probabilistic smoothing model to generate an optimized set of segmentation masks. In one embodiment, the probabilistic smoothing model is a conditional random fields (CRF) model that eliminates background noise and refines the outline and/or area within each bounding box that corresponds to the product. Thus, the image optimization module 175 returns an optimized set of segmentation masks for the product where noise and other random variations have been eliminated from the segmentation masks. In one embodiment, the bounding boxes are also optimized using probabilistic smoothing model.

In another embodiment, the labels are not bounding boxes and segmentations but instead, the system leverages multiple depth sensing cameras that produce RGB-D data or XYZ-RGB data. Then the instance segmentation model would produce a bounding rectangular, frustum or other shape with a set of voxels inside those bounding volumes, such that each voxel defines a small cube of space with a single scalar value where a low value at or close to 0 would denote the absence of that object and a high value at or close to 1 would indicate the presence of the object. The 3-dimensional version of the CRF and tracking algorithms can be used in the same fashion as in the 2-dimensional case.

In one embodiment, to clean the segmentation masks even further, an advanced deep learning method can be applied. Thus, the machine learning model module 180 takes as input the optimized segmentation masks and uses them to train a very small (one layer or two layers) deep learning computer vision model, such as a convolutional neural network (CNN) with the optimized set of segmentation masks taken as truth and trains until convergence. Since the model is very small, it is restrained from overfitting and reaching 100% training accuracy but fits typically the product outlines exactly since this is an easier task and requires less layers to fit well, converting the initially optimized set of segmentation masks for that product to produce an even further-optimized set of segmentations masks. Thus, the machine learning model is retrained for each and every product video with the optimized set of segmentation masks for that product video to produce an even further-optimized set of segmentations masks for that product video.

The collage generation module 185 generates product collages from the images of the products in a simulated environment to generate training examples of multiple products in context for a product recognition model. In one embodiment, the images of multiple products (e.g., their outline) are randomly added to an image, such as that of a shopping cart or checkout counter, to generate a simulated environment training example that includes multiple products. Accordingly, a large set of product collages (e.g., 1000-10,000) can be generated from randomly selected images of products across many different image backgrounds. This set of product collages can be added to the master training set for training the product recognition model.

The data store 190 stores each refined segmentation mask with a corresponding bounding box and the product identifier for the product as a training examples for a product recognition model, such as an automated checkout system of a grocery or retail store.

Product Onboarding Apparatus

Figure 2:
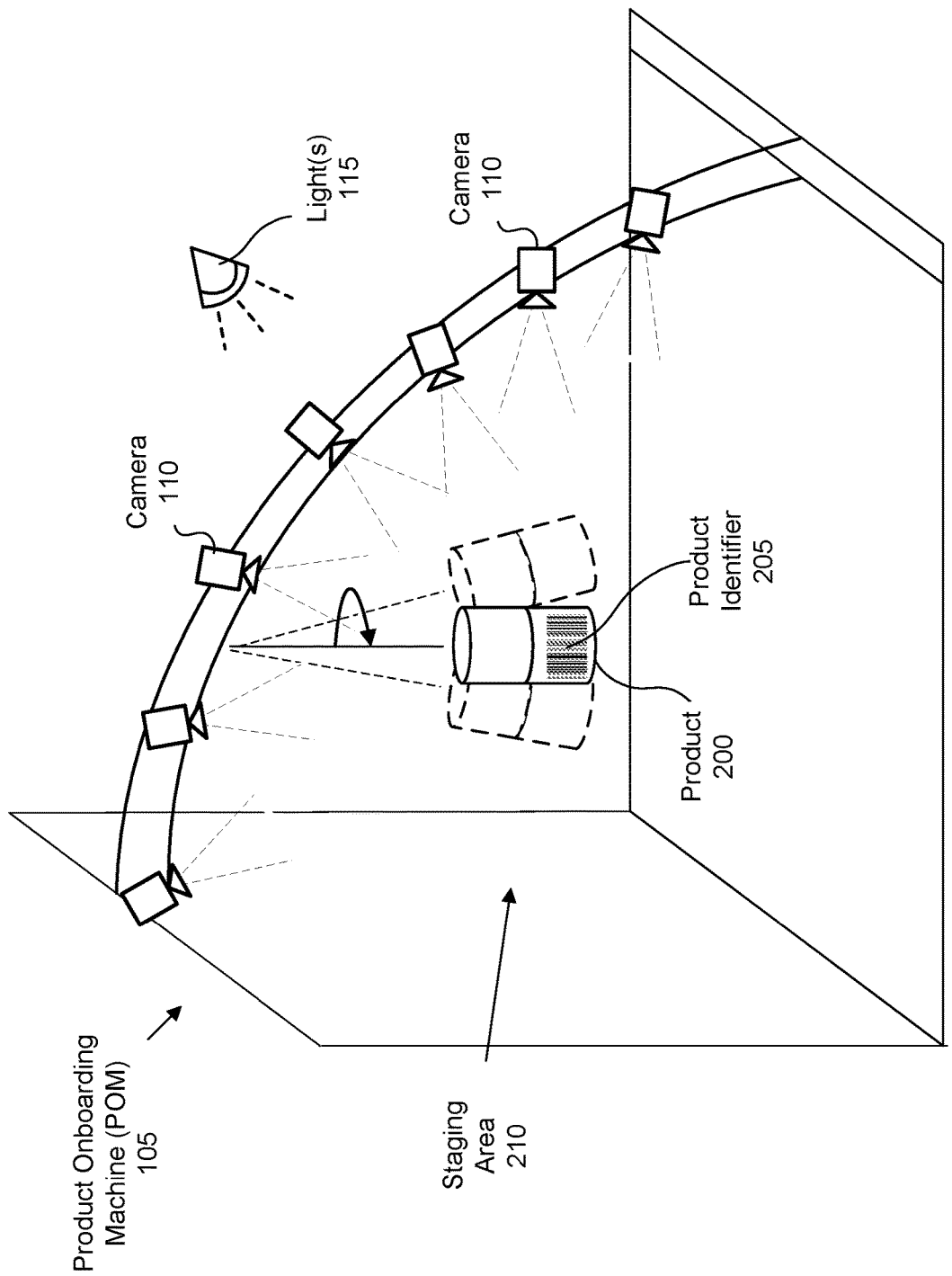
FIG. 2 is a diagram of a product onboarding apparatus, in accordance with an embodiment.

FIG. 2 is a diagram of the POM 105, in accordance with an embodiment. As described above, the POM 105 includes multiple cameras 110 and lights 115 to capture a plurality of images of each product. The cameras 110, in one embodiment, are each positioned on an arcing arm in a camera array of the POM 105 to capture the image data of the product from a different perspective. As shown in FIG. 2, each camera 110 is positioned at a different angle and distance relative to the other cameras 110 to capture image data of the product from the different perspectives.

Accordingly, FIG. 2 additionally shows a product 200 that includes a product identifier 205. The product 200 is placed within a staging area 210 in view of the cameras 110. In this embodiment, the product 200 is placed within the POM 105 by hanging the product by a wire such that the product hangs within a focus area of the cameras 110. The product is then spun and/swung in order for the cameras 110 to capture many different views of the product 200 in the image data. For example, an operating can hang product 200 in staging area 210 and spin and wobble the product 200. Then, for the first 5-20 seconds of video, there may be no change in background conditions in order to capture image data of the product from all angles under sufficient lighting. After 5-20 seconds, the lights 115 may vary brightness, such as getting dimmer and then brighter, and/or cycle through different colors. Accordingly, after completed, the product 200 can be flipped upside-down and the process may be repeated. This process is then repeated for each product.

In another embodiment, the product 200 can be placed on a table and a human can manually move the product 200 around spanning all rotations and positions of the product while the lights 115 vary the lighting and cameras 110 capture the image data. Various other methods can also be used; however, the goal is to move the product 200 enough while vary the lighting to capture image data of the product 200 under various conditions.

Image Data Set Optimization for Product Onboarding

Figure 3:
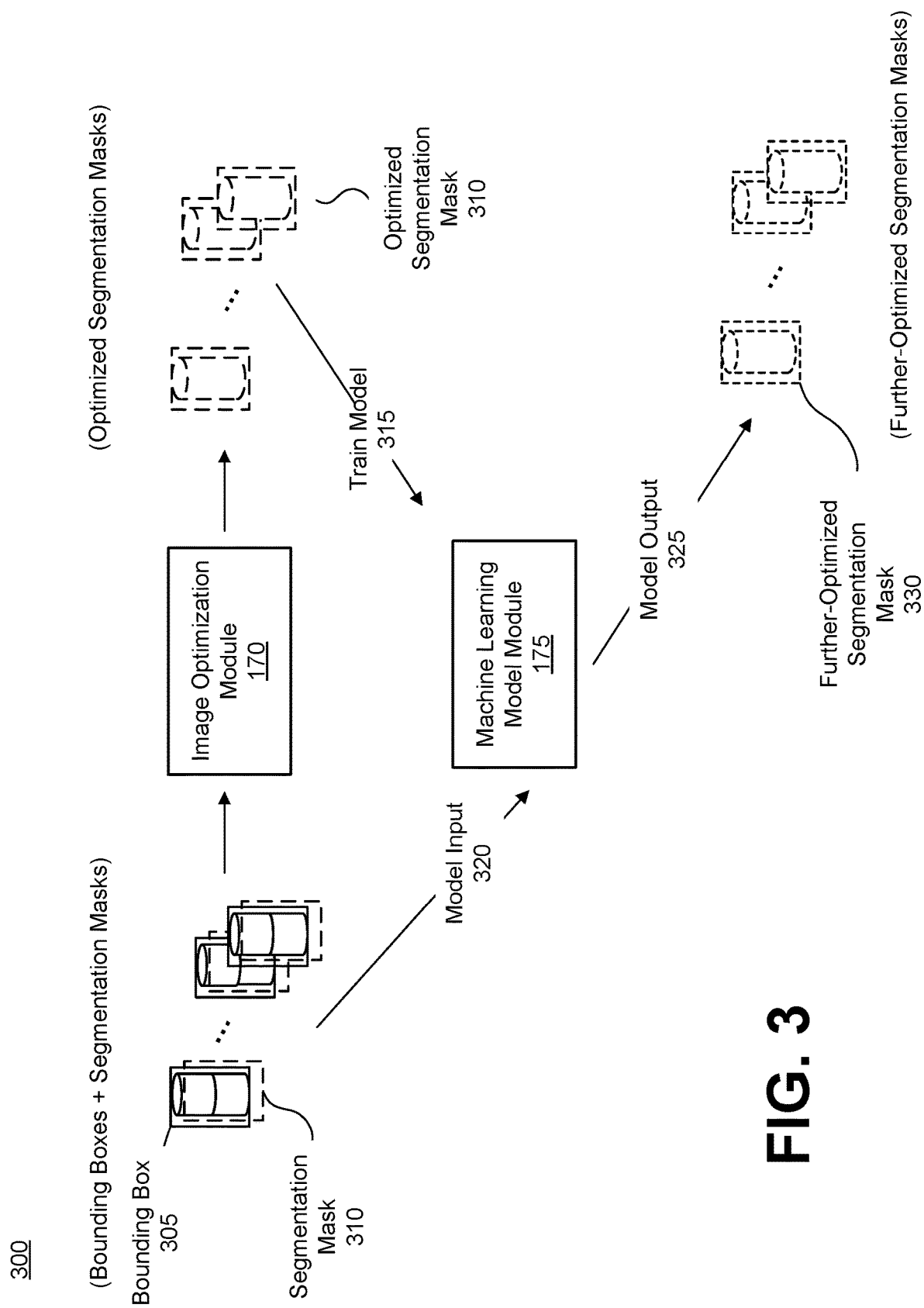
FIG. 3 is a flow diagram of onboarding a product to generate a training example for the product for use in training a product recognition model, in accordance with an embodiment.

FIG. 3 is a process flow diagram 300 for image data set optimization for onboarding products, in accordance with an embodiment. The process flow diagram 300 may include additional or fewer steps and the steps may occur in a different order. Further, various steps, or combinations of steps, can be repeated any number of times during execution of the method.

The process flow of FIG. 3 begins after bounding detected in each image frame and after a segmentation mask has been identified within each bounding box, as described above with respect to FIG. Thus, FIG. 3 shows, for each image frame, a bounding box 305 and a segmentation mask 310. Accordingly, the segmentation masks 310 are provided to image optimization module 170 that optimizes the segmentation masks 310 for the product using a probabilistic smoothing model to generate an optimized set of segmentation masks, as described above.

The optimized set of segmentation masks is provided to the machine learning model module 180 to be further-optimized. The optimized set of segmentation masks are used to train a machine learning model 315 with the optimized set of segmentation masks. As described above, the machine learning model is a small convolution neural network (CNN) with perhaps only one, two, or three layers that is trained with the optimized set of segmentation masks. Accordingly, the machine learning model module 180 runs the machine learning model trained with the optimized set of segmentation masks, and perhaps the bounding boxes as well, of the product as model inputs 320 to the small CNN. The machine learning model module 180 generates a model output 325 comprising a set of further-optimized segmentation masks 330 for the product that have been further refined by the machine learning model. Accordingly, each further-optimized segmentation mask 330 with its corresponding bounding box 305 and the product identifier for the product are stored as a training examples for the product recognition model while the original segmentation mask 305 from each image frame is discarded. The further-optimized segmentation masks, which are values between 0 and 1, can be rounded to be 0s or 1s if using hard labels rather than soft labels.

Method for Training on the Master Training Set

Figure 4A:
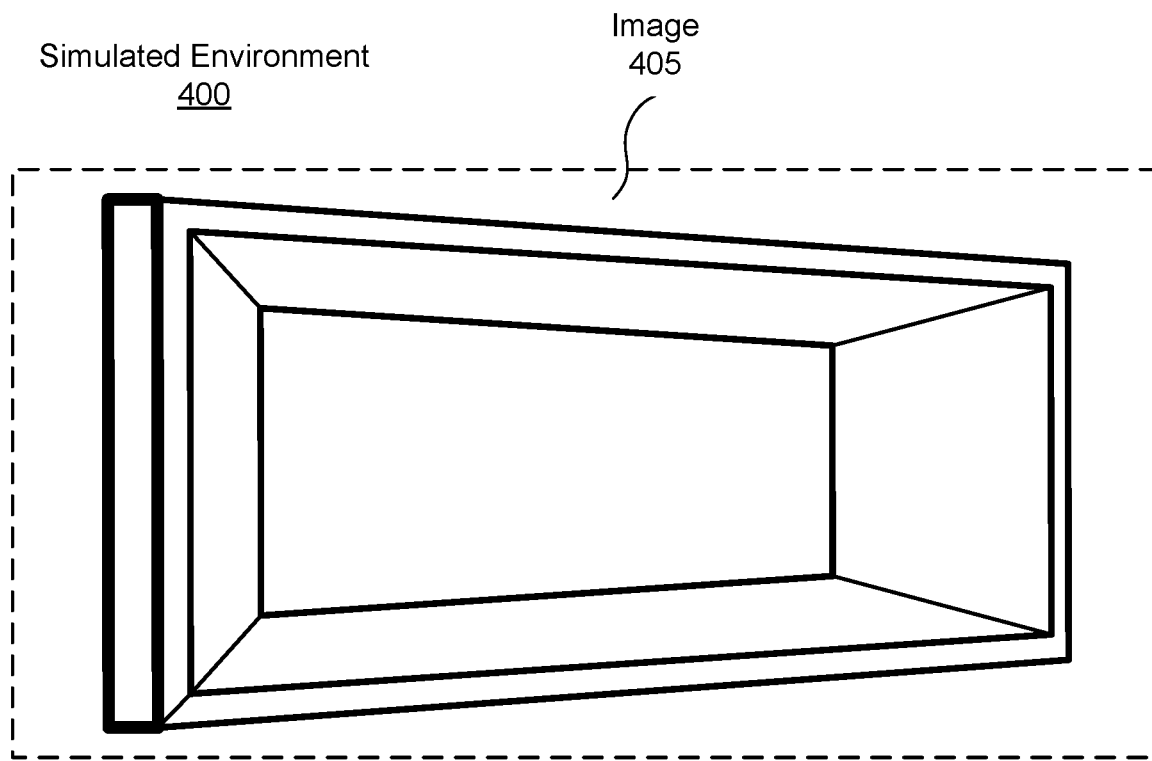
FIGS. 4A-4B show a process for generating product collages from the images of the products in a simulated environment to generate training examples of multiple products in a simulated environment for a product recognition model, in accordance with an embodiment.
Figure 4B:
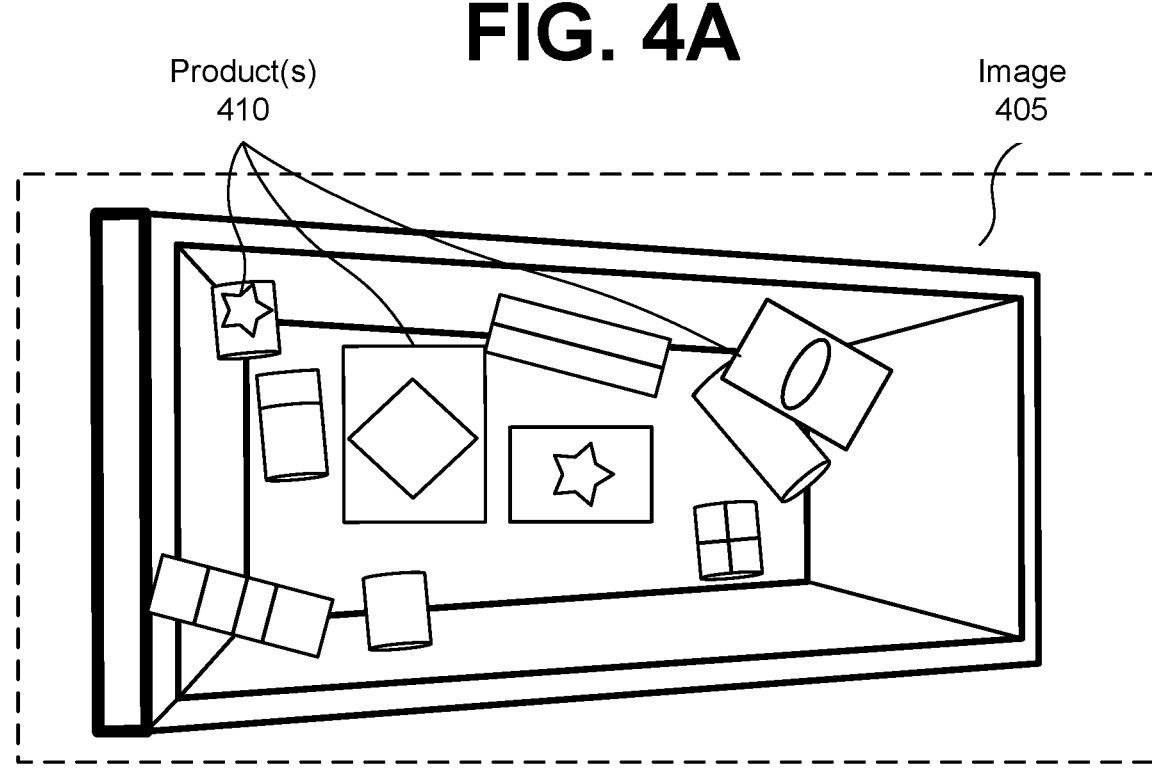

FIGS. 4A-4B show a process for generating product collages from the images of the products in a simulated environment to generate training examples of multiple products in context for a product recognition model, in accordance with an embodiment. In this embodiment, the images of multiple products (e.g., their outline) are randomly added to an image, such as that of a shopping cart or checkout counter, to generate a simulated environment training example that includes multiple products.

FIG. 4A shows a simulated environment 400 that includes an image 405 of a shopping cart, in accordance with one embodiment. In one embodiment, the further-optimized segmentation mask of each product is used to segment-out the original pixels of the product from a randomly selected image of the product and then inserted onto the image 405. The products are inserted in any order, on top of each other, randomly rotated, and so forth to generate a product collage training example of multiple products. For example, with the segmentation mask for a known product in a bounding box, the transparency of all pixels outside the segmentation mask can be set to 0 and then the bounding box can be randomly (or algorithmically) overlayed onto the image 405 of the simulated environment 400 in which the product prediction model will be used. This creates a labeled training example that can be used to train a model that predicts bounding boxes, product ids, and/or segmentation masks.

FIG. 4B shows multiple products 410 that have been randomly selected and added to image 405. Accordingly, the collage generation module takes an image from a specific or random vantage point and saves the image with the labels to be used as training data. This method permits any scene to exist in the training data, with any background with any number of products in any orientation or layering. Accordingly, a large data set of product collages (e.g., 1000-10,000) can be generated from randomly selected images of products across many different image backgrounds. This data set of product collages can be added to the master training set for training the product recognition model.

Method for Product Onboarding

Figure 5:
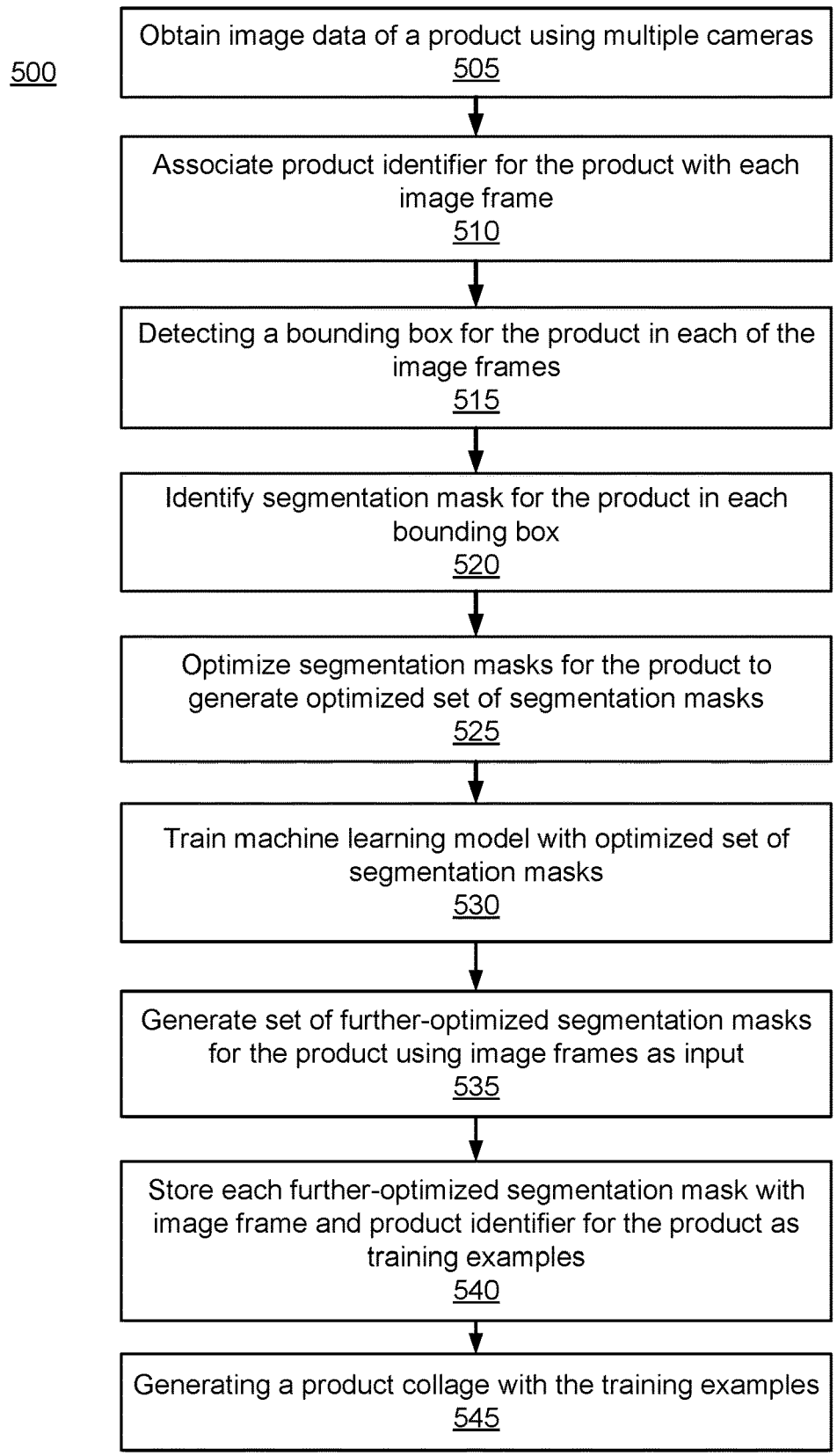
FIG. 5 is a flowchart for product onboarding to generate training examples for a product recognition model, in accordance with an embodiment.

FIG. 5 is a flowchart for product onboarding, in accordance with an embodiment. The flowchart 500 may include additional or fewer steps and the steps may occur in a different order. Further, various steps, or combinations of steps, can be repeated any number of times during execution of the method.

The product onboarding system 150 obtains 505 the image data of a product using a plurality of cameras located to capture the product from different perspectives. The image data includes a plurality of image frames that are captured while the product is moving in one or more dimensions (e.g., rotating, swinging, etc.). In one embodiment, the system capturing the image data is the same as the system processing the image data. In other embodiments, the systems can be separate. As described herein, the image data is captured by the POM 105 that is in communication (either directly or via a network) with the product onboarding system 150.

The product onboarding system 150 associates 510 a product identifier for the product with each of the plurality of image frames. For example, a system associates the product identifier (e.g., a universal product code (UPC), stock keeping unit (SKU), etc.) for the product with each image frame by tagging a folder comprising the image data for the product. In another embodiment, the product identifier is described in the metadata of each image frame.

The product onboarding system 150 identifies 515 a bounding box for the product in each of the plurality of image frames by tracking the product through the plurality of image frames. As described with respect to FIG. 2, the product can be hung and swung and/or spun from a wire in order for the cameras to capture many different angles and positions of the product. In one embodiment, each image frame is cropped based on the output of the bounding box model post or pre-tracking.

The product onboarding system 150 predicts 525 a segmentation mask for the product in each bounding box using a segmentation algorithm. The segmentation algorithm locates the product in each bounding box and identifies the boundaries of the product. In one embodiment, this prediction includes assigning a value between 0 and 1 to each pixel of the bounding box indicating the model's confidence that that pixel is an object pixel and not a background pixel; a 0 represents a background pixel and a 1 represents a product pixel. Thus, the segmentation mask describes the shape or outline of the product within each bounding box. As a result, the segmentation mask provides a recognition system with a description of where the product (i.e., relevant portion) begins and ends inside each bounding box.

The product onboarding system 150 optimizes 525 the segmentation masks for the product to generate an optimized set of segmentation masks for the product. In one embodiment, the segmentation masks are optimized using a probabilistic smoothing model, such as a CRF model, that eliminates background noise and refines the outline and/or area within each bounding box that corresponds to the product. Thus, the optimized set of segmentation masks for the product have been essentially cleaned of noise and other random variations. In one embodiment, the bounding boxes are also optimized using probabilistic smoothing model leveraging temporal and spatial assumptions or perhaps using signal from other cameras in the system by knowing where those other cameras are and how they are oriented in relation to itself.

The product onboarding system 150 trains 530 a machine learning model with the optimized set of segmentation masks. In one embodiment, the machine learning model is a small convolution neural network (CNN) that is trained with the optimized set of segmentation masks. Accordingly, the machine learning model is retrained for each product with the optimized set of segmentation masks for that product to learn how to better recognize the product.

The product onboarding system 150 generates 535 a set of further-optimized segmentation masks for the product using the bounding box and optimized segmentation masks of the plurality of image frames as input. Accordingly, the machine learning model trained with the optimized set of segmentation masks is run using the bounding boxes of the product as inputs to the model. The machine learning model, thus, generates a set of further-optimized segmentation masks for the product that have been further-optimized using the model. Thus, the machine learning model is trained with outlines of the product from the original optimized segmentation masks and then run on the image frames to identify the outline of the product within the bounding box of each image frame to produce the further-optimized segmentation masks.

The product onboarding system 150 stores 540 each further-optimized segmentation mask with a corresponding image frame of the plurality of image frames and the product identifier for the product as a training examples in a master training set for a product recognition model.

The product onboarding system 150 generates 545 product collages from the images of the products in a simulated environment to generate training examples of multiple products in context for a product recognition model. In one embodiment, the system obtains a background image (e.g., a shopping cart, checkout counter, etc.) for the simulated environment. Then, the system randomly selects a set of products at random orientations from the image data of the set of products. Accordingly, the system segments the image data for each of the randomly selecting set of products based on the a further-optimized segmentation mask for the product at the selected random orientation. The system then randomly adds the segmented image data to the background image for the simulated environment for each of the randomly selecting set of products. Finally, the system stores the background image for the simulated environment as a training examples for a product recognition model.

Once the Master Training Set has been collected, which consists of N products, $N_i$ images per product, $N_i$ bounding boxes per product, and $N_i$ segmentation masks per product, a Deep Learning Computer Vision model (e.g., similar to the Mask-RCNN) is trained on all N products. It can also be used to train an embedding model to map each segmented set of pixels or cropped bounding box to a vector where it is trained to have vectors of the same class close to each other in the vector space and those of different classes far away from each other in the vector space. Further to this effect, it can be trained to have vectors of the same class and orientation close to each other and those of different classes or different orientations far away from each other in the vector space.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   obtaining image data of a product using a plurality of cameras, or depth cameras, the image data including a plurality of image frames and being captured while the product is moving in one or more dimensions;
   associating a product identifier for the product with each of the plurality of image frames;
   detecting a bounding box for the product in each of the plurality of image frames;
   using a bounding box smoothing algorithm to smooth the bounding box detections temporally;
   identifying a segmentation mask for the product in each bounding box;
   optimizing the segmentation masks for the product to generate an optimized set of segmentation masks for the product;
   training a machine learning model with the optimized set of segmentation masks;
   generating, using the machine learning model, a set of further-optimized segmentation masks for the product using the plurality of image frames as input, the set of further-optimized segmentation masks comprising a further-optimized segmentation mask for each bounding box and image frame of the plurality of image frames; and
   storing each further-optimized segmentation mask with a corresponding image frame of the plurality of image frames and the product identifier for the product as a training examples for a product recognition model.

2. The method of claim 1, wherein the image data of the product is captured while the is hung by a wire such that the product hangs within a focus area of the plurality of cameras, wherein the image data is further captured while to product is moving for the plurality of cameras to capture the image data from a number of different angles.

3. The method of claim 1, wherein each camera of the plurality of cameras captures a different view of the product relative to other cameras of the plurality of cameras.

4. The method of claim 1, wherein the segmentation masks for the product are optimized using a probabilistic model.

5. The method of claim 4, wherein the probabilistic model is a conditional random fields (CRF) model.

6. The method of claim 1, wherein the machine learning model is a convolutional neural network and, wherein the convolutional neural network is retrained for each different product using the optimized set of segmentation masks for that product.

7. The method of claim 1, wherein the image data of the product includes volume or depth information of the product from while varying at least one of lighting, background, occlusions, camera or resolution.

8. A method comprising:
   capturing image data of a product using a plurality of cameras, the image data including a plurality of image frames and being captured while the product is moving in one or more dimensions;

associating a product identifier for the product with each of the plurality of image frames;

identifying, by tracking the product through the plurality of image frames, a bounding box for the product in each of the plurality of image frames;

identifying, using instance segmentation, a segmentation mask for the product in each bounding box;

optimizing, using a probabilistic model, the segmentation masks for the product to generate an optimized set of segmentation masks for the product;

training a machine learning model with the optimized set of segmentation masks; and generating, using the machine learning model, a set of further-optimized segmentation masks for the product using the plurality of image frames as input, the set of further-optimized segmentation masks comprising a further-optimized segmentation mask for each image frame of the plurality of image frames.

9. The method of claim 8, further comprising:

generating a plurality of product collages from the image data of a plurality of products in a simulated environment to generate training examples of multiple products in context for a product recognition model.

10. The method of claim 9, wherein generating a plurality of product collages from the image data of a plurality of products comprises:

obtaining a background image for the simulated environment;

randomly selecting a set of products at random orientations from the image data of the set of products;

segmenting, for each of the randomly selecting set of products, the image data based on the a further-optimized segmentation mask for the product at the selected random orientation;

randomly adding, to the background image for the simulated environment, the segmented image data for each of the randomly selecting set of products; and storing the background image for the simulated environment as a training examples for a product recognition model.

11. The method of claim 8, wherein the segmentation masks for the product are optimized using a probabilistic model, wherein the probabilistic model is a conditional random fields (CRF) model.

12. The method of claim 8, wherein the machine learning model is a convolutional neural network and, wherein the convolutional neural network is retrained for each different product using the optimized set of segmentation masks for that product.

13. The method of claim 8, wherein the image data of the product includes volume or depth information of the product from while varying at least one of lighting, background, occlusions, camera or resolution.

14. A non-transitory computer-readable storage medium comprising instructions that, when executed by a processor, causes the processor to:

obtain image data of a product using a plurality of cameras, the image data including a plurality of image frames and being captured while the product is moving in one or more dimensions;

associate a product identifier for the product with each of the plurality of image frames;

identify a bounding box for the product in each of the plurality of image frames;

identify a segmentation mask for the product in each bounding box;

optimize the segmentation masks for the product to generate an optimized set of segmentation masks for the product;

train a machine learning model with the optimized set of segmentation masks;

generate, using the machine learning model, a set of refined segmentation masks for the product using the plurality of image frames as input, the set of refined segmentation masks comprising a refined segmentation mask for each image frame of the plurality of image frames; and store each refined segmentation mask with a corresponding image frame of the plurality of image frames and the product identifier for the product as a training examples for a product recognition model.

15. The non-transitory computer-readable storage medium of claim 14, wherein the image data of the product is captured while the is hung by a wire such that the product hangs within a focus area of the plurality of cameras, wherein the image data is further captured while to product is moving for the plurality of cameras to capture the image data from a number of different angles.

16. The non-transitory computer-readable storage medium of claim 14, wherein each camera of the plurality of cameras captures a different view of the product relative to other cameras of the plurality of cameras.

17. The non-transitory computer-readable storage medium of claim 14, wherein the segmentation masks for the product are optimized using a statistical model.

18. The non-transitory computer-readable storage medium of claim 17, wherein the probabilistic model is a conditional random fields (CRF) model.

19. The non-transitory computer-readable storage medium of claim 14, wherein the machine learning model is a convolutional neural network and, wherein the convolutional neural network is retrained for each different product using the optimized set of segmentation masks for that product.

20. The non-transitory computer-readable storage medium of claim 14, wherein the image data of the product includes volume or depth information of the product from while varying at least one of lighting, background, occlusions, camera or resolution.

* * * * *